United States Patent
Wang et al.

(10) Patent No.: US 10,055,663 B2
(45) Date of Patent: *Aug. 21, 2018

(54) COMPARING EXTRACTED CARD DATA WITH USER DATA

(71) Applicant: GOOGLE LLC, Mountain View, CA (US)

(72) Inventors: Xiaohang Wang, Millburn, NJ (US); Farhan Shamsi, Rego Park, NY (US); Sanjiv Kumar, White Plains, NY (US); Henry Allan Rowley, Sunnyvale, CA (US); Marcus Quintana Mitchell, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 15/229,071

(22) Filed: Aug. 4, 2016

(65) Prior Publication Data
US 2016/0342853 A1 Nov. 24, 2016

Related U.S. Application Data

(63) Continuation of application No. 14/504,214, filed on Oct. 1, 2014, now Pat. No. 9,436,884, which is a (Continued)

(51) Int. Cl.
G06K 9/00 (2006.01)
G06Q 20/34 (2012.01)
(Continued)

(52) U.S. Cl.
CPC ............ G06K 9/186 (2013.01); G06K 7/10 (2013.01); G06K 9/00469 (2013.01); G06K 9/18 (2013.01);
(Continued)

(58) Field of Classification Search
CPC ............ G06K 7/10; G06K 9/18; G06K 9/228; G06K 9/00469; G06K 2209/01;
(Continued)

(56) References Cited

U.S. PATENT DOCUMENTS 6,453,079 B1 9/2002 McInerny
8,483,473 B2 7/2013 Roach et al.
(Continued)

FOREIGN PATENT DOCUMENTS

CN 101743541 A 6/2010
WO 2013/002955 A1 1/2013
(Continued)

OTHER PUBLICATIONS

Chang, "U.S. Office Action issued in copending U.S. Appl. No. 14/077,862, filed Nov. 12, 2013", dated Jan. 31, 2014, 10 pages.
(Continued)

Primary Examiner — Jon Chang
(74) Attorney, Agent, or Firm — Johnson, Marcou & Isaacs, LLC

(57) ABSTRACT

Extracting card data comprises receiving, by one or more computing devices, a digital image of a card; perform an image recognition process on the digital representation of the card; identifying an image in the digital representation of the card; comparing the identified image to an image database comprising a plurality of images and determining that the identified image matches a stored image in the image database; determining a card type associated with the stored image and associating the card type with the card based on the determination that the identified image matches the stored image; and performing a particular optical character recognition algorithm on the digital representation of the card, the particular optical character recognition algorithm being based on the determined card type. Another example
(Continued)

uses an issuer identification number to improve data extraction. Another example compares extracted data with user data to improve accuracy.

15 Claims, 10 Drawing Sheets

Related U.S. Application Data continuation of application No. 14/077,862, filed on Nov. 12, 2013, now Pat. No. 8,879,783.

(60) Provisional application No. 61/841,260, filed on Jun. 28, 2013.

(51) Int. Cl.
  *G06K 9/18* (2006.01)
  *G06K 7/10* (2006.01)
  *G06Q 20/32* (2012.01)
  *G06K 9/22* (2006.01)
  *G06K 9/62* (2006.01)
  *G06K 9/20* (2006.01)
  *G06Q 20/36* (2012.01)
  *H04N 1/00* (2006.01)

(52) U.S. Cl.
  CPC ........... *G06K 9/2054* (2013.01); *G06K 9/228* (2013.01); *G06K 9/6202* (2013.01); *G06Q 20/32* (2013.01); *G06Q 20/3223* (2013.01); *G06Q 20/3276* (2013.01); *G06Q 20/34* (2013.01); *G06Q 20/36* (2013.01); *G06K 2209/01* (2013.01); *H04N 1/00307* (2013.01)

(58) Field of Classification Search
  CPC .... G06K 9/186; G06K 9/6202; G06K 9/2054; G06K 9/325; G06Q 20/3276; G06Q 20/32; G06Q 20/3223; G06Q 20/34; G06Q 20/36; H04N 1/00307
  See application file for complete search history.

(56) References Cited

U.S. PATENT DOCUMENTS

| | | | |
|---|---|---|---|
| 8,879,783 | B1 | 11/2014 | Wang et al. |
| 8,931,693 | B1 | 1/2015 | Kumar et al. |
| 9,292,740 | B2 | 3/2016 | Kumar et al. |
| 9,436,884 | B2 | 9/2016 | Wang et al. |
| 2002/0047047 | A1 | 4/2002 | Poloniewicz et al. |
| 2005/0087598 | A1 | 4/2005 | Yamanaka et al. |
| 2006/0262910 | A1* | 11/2006 | Molnar ............. G06K 9/00469 379/88.17 |
| 2007/0076868 | A1 | 4/2007 | Ming |
| 2007/0133874 | A1* | 6/2007 | Bressan ................ G06K 9/03 382/181 |
| 2009/0173784 | A1 | 7/2009 | Yang |
| 2011/0089233 | A1 | 4/2011 | Locher |
| 2011/0091092 | A1 | 4/2011 | Nepomniachtchi et al. |
| 2012/0143760 | A1 | 6/2012 | Abulafia et al. |
| 2012/0234911 | A1 | 9/2012 | Yankovich et al. |
| 2012/0239542 | A1 | 9/2012 | Preston et al. |
| 2012/0284185 | A1 | 11/2012 | Mettler et al. |
| 2012/0310760 | A1 | 12/2012 | Phillips et al. |
| 2013/0004076 | A1 | 1/2013 | Koo et al. |
| 2013/0051610 | A1 | 2/2013 | Roach et al. |
| 2013/0148862 | A1 | 6/2013 | Roach et al. |
| 2014/0101648 | A1 | 4/2014 | Teh et al. |
| 2015/0006362 | A1 | 1/2015 | Mitchell et al. |
| 2015/0269557 | A1 | 9/2015 | Artman et al. |
| 2017/0061225 | A1 | 3/2017 | Mitchell et al. |

FOREIGN PATENT DOCUMENTS

| | | |
|---|---|---|
| WO | 2014/210548 A2 | 12/2014 |
| WO | 2014/210548 A3 | 2/2015 |

OTHER PUBLICATIONS

Chang, "U.S. Office Action issued in copending U.S. Appl. No. 14/504,214, filed Oct. 1, 2014", dated Nov. 19, 2015, 14 pages.
Fu, "U.S. Office Action issued in copending U.S. Appl. No. 14/062,655, filed Oct. 24, 2013", dated Sep. 3, 2015, 10 pages.
Fu, "U.S. Office Action issued in copending U.S. Appl. No. 14/062,655, filed Oct. 24, 2013", dated Mar. 2, 2015, 7 pages.
Google Inc., "TVCG Submission-Video Snapshots: Creating High-Quality Images from Video Clips", May 18, 2013, 17 pages.
Google Inc., "Understanding Optical Character Recognition (OCR)", Jan. 1, 2002, 7 pages.
Jacob, "Identification Nunmber and Check Digit Algorithms", Sep. 20, 2012, 11 pages.
Kincaid, "Card.io's SDK Makes Entering Credit Card Information as Easy as Taking a Snapshot", Jun. 23, 2011, 1 page.
Li, "Chinese Office Action issued in Chinese Application No. 201480042645.X", dated Aug. 16, 2016, 5 pages of English Translation and 5 pages of Chinese Office Action.
Moussaid, "International Preliminary Report on Patentability issued in International Application No. PCT/US2014/044719", dated Jan. 7, 2016, 12 pages.
Nicomsoft, "Optical Character Recognition (OCR)—How it Works", XP055147204, Feb. 5, 2012,, 2 pages.
Tschubel, "International Search Report and Written Opinion issued in International Application No. PCT/US2014/044719", dated Jan. 7, 2015, 17 pages.
Vo, "U.S. Office Action issued in copending U.S. Appl. No. 14/077,780, filed Nov. 12, 2013", dated Feb. 4, 2014, 8 pages.
Vo, "U.S. Office Action issued in copending U.S. Appl. No. 14/559,888, filed Dec. 3, 2014", dated Jun. 30, 2015, 7 pages.
Wikipedia, "Luhn-Algoritmen", From Wikipedia, Mar. 13, 2013, 2 pages.
Li, et al., "Chinese Office Action issued in Chinese Application No. 201480042645.X", dated Feb. 7, 2017, 3 pages of English Translation and 3 pages of Chinese Office Action.
"Chinese Office Action issued in Chinese Application No. 201480042645.X", dated May 24, 2017, 8 pages of English Translation and 6 pages of Chinese Office Action.
"Chinese Office Action issued in Chinese Application No. 201480042645.X", dated Sep. 28, 2017, 7 pages of English Translation and 6 pages of Chinese Office Action.
Aguilar, "European Office Action issued in European Application No. 14744687.6", dated Oct. 28, 2016, 5 pages.
Chinese Patent Office, "Chinese Office Action issued in Chinese Application No. 201480042645.X", dated Feb. 26, 2018, 8 pages of English Translation and 5 pages of Chinese Office Action.
Chang, "U.S. Office Action issued in copending U.S. Appl. No. 15/342,116, filed Feb. 11, 2016", dated Apr. 17, 2018, 11 pages.

* cited by examiner

220

305
OCR application performs image recognition algorithm on card image

310
OCR application compares images on card to an image database

315
OCR application identifies matching images

320
OCR application identifies card type from data stored with images in database Block 225, Figure 2

Fig. 3

COMPARING EXTRACTED CARD DATA WITH USER DATA

RELATED APPLICATION

This patent application is a continuation of and claims priority to U.S. patent application Ser. No. 14/504,214, filed Oct. 1, 2014 and entitled "Comparing Extracted Card Data with User Data," which is a continuation of and claims priority to U.S. patent application Ser. No. 14/077,862, filed Nov. 12, 2013 and entitled "Comparing Extracted Card Data with User Data," which claims priority under 35 U.S.C. § 119 to U.S. Patent Application No. 61/841,260 filed Jun. 28, 2013 and entitled "Extracting Card Data Using Card Art." The entire contents of the above-identified applications are hereby fully incorporated herein by reference.

TECHNICAL FIELD

The technology disclosed herein pertains to extracting financial card information, and more particularly to using card art, the issuer identification number ("TIN") database, and user data to improve the extraction process.

BACKGROUND

When consumers make online purchases or purchases using mobile devices, they are often forced to enter credit card information into the mobile device for payment. Due to the small screen size and keyboard interface on a mobile device, such entry is generally cumbersome and prone to errors. Users may use many different cards for purchases, such as credit cards, debit cards, stored value cards, and other cards. Information entry difficulties are multiplied for a merchant attempting to process mobile payments on mobile devices for multiple transactions.

Current applications for obtaining payment information from a payment card require a precise positioning of the card in the scan. Typically, a box is presented on the user interface of the user computing device. The user is required to precisely line the card up within the box to allow the user computing device to recognize the card.

Current applications do not utilize other available data, such as card art, the issuer identification number ("IIN") database, or user data to improve the extraction process.

SUMMARY

The technology of the present disclosure includes computer-implemented methods, computer program products, and systems for extracting card data. Extracting card data comprises receiving, by one or more computing devices, a digital image of a card; perform an image recognition process on the digital representation of the card; identifying an image in the digital representation of the card; comparing the identified image to an image database comprising a plurality of images and determining that the identified image matches a stored image in the image database; determining a card type associated with the stored image and associating the card type with the digital representation of the card based at least in part on the determination that the identified image matches the stored image; and performing a particular optical character recognition algorithm on the digital representation of the card, the particular optical character recognition algorithm being based at least in part on the determined card type. Another example uses an issuer identification number to improve data extraction. Another example compares extracted data with user data to improve accuracy.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIG. 3 is a block flow diagram depicting methods for identifying card types based on images on cards, in accordance with certain example embodiments.

DETAILED DESCRIPTION OF THE EXAMPLE EMBODIMENTS

Overview

Figure 1:
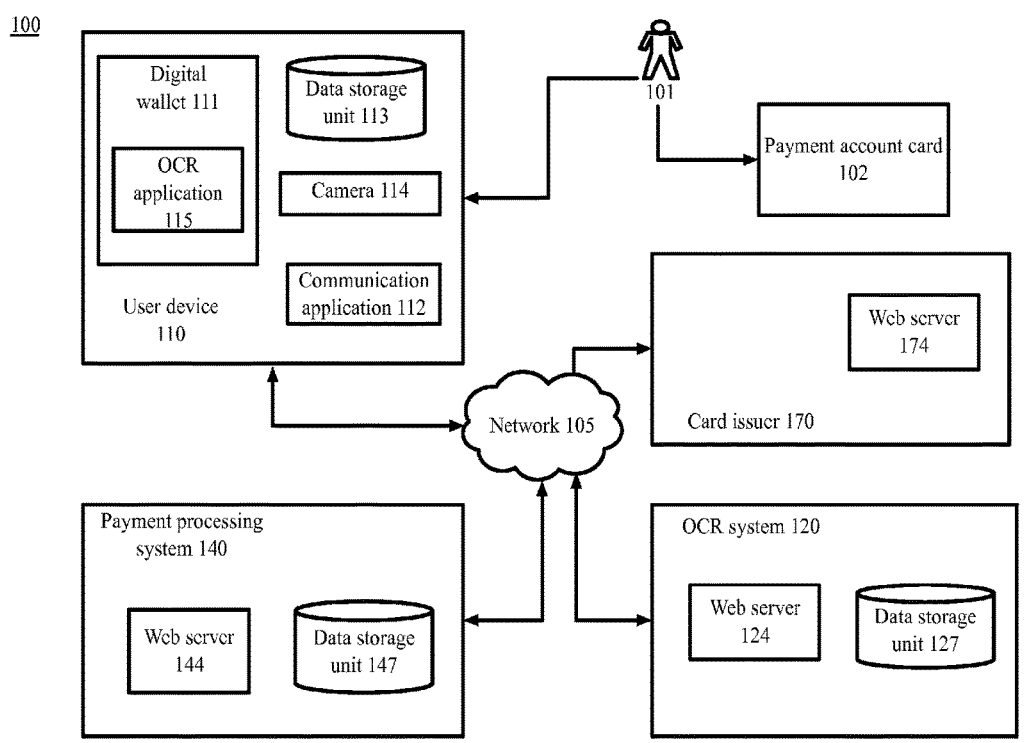
FIG. 1 is a block diagram depicting a system for extracting financial account information from a card, in accordance with certain example embodiments of the technology disclosed herein.

Embodiments herein provide computer-implemented techniques for allowing a user computing device to extract financial card information using optical character recognition ("OCR"). The process of extracting financial card information may use image recognition of the card art to improve the OCR. Determining the type of card based on the card art may allow the OCR application to limit or bias the OCR results to data related to the card type. The process of extracting financial card information can be improved by using a checksum algorithm on the financial account information. The checksum algorithm can be used to verify that the extracted account number is a valid number. The process of extracting financial card information can be improved by using an issuer identification number ("IIN") database to bias the OCR search. The IIN database can be used to verify that parts of the extracted account number are valid numbers and to determine the card type. Determining the type of card based on the TIN database allows the OCR application to limit or bias the OCR results to data related to the card type.

Additionally, the process of extracting financial card information can be improved by using user data to verify or bias user identification.

Throughout the specification, the general term "card" will be used to represent any type of physical card instrument, such as a magnetic stripe card. In example embodiments, the different types of card represented by "card" can include credit cards, debit cards, stored value cards, loyalty cards, identification cards, or any other suitable card representing an account or other record of a user or other information thereon. Example embodiments described herein may be applied to the images of other items, such as receipts, boarding passes, tickets, and other suitable items. The card may also be an image or facsimile of the card. For example, the card may be a representation of a card on a display screen or a printed image of a card.

The user may employ the card when making a transaction, such as a purchase, ticketed entry, loyalty check-in, or other suitable transaction. The user may obtain the card information for the purpose of importing the account represented by the card into a digital wallet application module of a computing device or for other digital account purposes. The card is typically a plastic card containing the account information and other data on the card. In many card embodiments, the customer name, expiration date, and card numbers are physically embossed or otherwise written on the card. The embossed information is visible from both the front and back of the card, although the embossed information is typically reversed on the back of the card.

A user may desire to enter the information from the card into a mobile user computing device or other computing device, for example, to conduct an online purchase, to conduct a purchase at a merchant location, to add the information to a wallet application on a user computing device, or for any other suitable reason. In an example, the user desires to use a mobile computing device to conduct a purchase transaction using a digital wallet application module executing on the mobile computing device. The digital wallet application module may require an input of the details of a particular user payment account to conduct a transaction with the particular user payment account or to set up the account. Due to the small screen size and keyboard interface on a mobile device, such entry can be cumbersome and error prone for manual input. Additionally, a merchant system may need to capture card information to conduct a transaction or for other reasons.

In addition to account identifiers, the front of the card typically contains logos of the issuer of the card, pictures chosen by the user or the issuer, other text describing the type or status of the user account, a security code, and other marketing and security elements, such as holograms or badges. The name, card expiration date, and the account identifier, such as a credit card number, may be embossed on the front of the card such that the information protrudes from the front of the card.

The user employs a mobile phone, digital camera, or other user computing device to capture an image of the card associated with the account that the user desires to input into the user computing device. The image may be obtained from the camera module of a user computing device, such as the camera on a mobile phone. The image may be obtained from a scanner coupled to the user computing device or any other suitable digital imaging device. The image may be obtained from video captured by the user computing device. The image may be accessed from a storage location on the user computing device, from a remote storage location, or from any suitable location. All sources capable of providing the image will be referred to herein as a "camera."

An OCR application receives the image of the card from the camera. The functions of the OCR application may be performed by any suitable module, hardware, software, or application operating on the user computing device. Some, or all, of the functions of the OCR application may be performed by a remote server or other computing device, such as the server operating in an OCR system. For example, a digital wallet application module on the user computing device may obtain the image of the card and transmit the image to the OCR system for processing. In another example, some of the OCR functions may be conducted by the user computing device and some by the OCR system or another remote server. Examples provided herein may indicate that many of the functions are performed by an OCR application on the user computing device, but some or all of the functions may be performed by any suitable computing device.

The image is presented on the user interface of the user computing device as a live video image of the financial card. The OCR application can isolate and store one or more images from the video feed of the camera. For example, the user may hover the camera function of a user computing device over a financial card and observe the representation of the financial card on the user interface of the user computing device. The user may actuate or real or virtual button on the user computing device to capture a preferred image. The OCR application may select the preferred image automatically.

The OCR application, the camera module, or the user computing device, or other computing device performs blur detection on the image. The image may be recognized as blurry, overly bright, overly dark, or otherwise obscured in a manner that prevents a high resolution image from being obtained. The OCR application, or other computing device, may adjust the image capturing method to reduce the blur in the image. For example, the OCR application may direct the camera to adjust the focus on the financial card. In another example, the OCR application may direct the user to move the camera closer to, or farther away from, the financial card. In another example, the OCR application may perform a digital image manipulation to remove the blur. Any other suitable method of correcting a blurred image can be utilized.

The OCR application isolates the image of the card. The OCR application can use any image data manipulation or image extraction to isolate the card image.

The OCR application may crop out a portion of the image to display only the desired information from the card. For example, if the card in the image is a credit card, the OCR application accesses information associated with the expected location of the account number of a credit card. The expected location may be obtained from a database of card layouts stored on the user computing device or in another suitable location. For example, credit cards, driver's licenses, loyalty cards, and other cards typically meet an industry standard for the data locations and the layout of the card. The industry standards may be stored in the OCR application or in a location accessible by the OCR application.

The OCR application performs an image recognition algorithm on the card image. The OCR application may use any suitable algorithm, process, method, or other manner of recognizing card images. For example, the OCR application may isolate images, such as card art, within the image of the card and can compare the card art images to a stored database of images to identify matching images. The OCR application may apply an OCR algorithm to one or more words identified in the card art.

The OCR application identifies images, logos, words, icons, pictures, badges, and other features of the art on the card image. The OCR application extracts the identity of an image from the information associated with a matching image in the database. For example, when the OCR application compares the identified art to a database of images and locates a matching image, the OCR application accesses any data stored with the matching image.

The data stored with the matching images may include an identification of the card type. For example, the OCR application may identify a logo on the card image that matches a logo in the database. The logo may be identified in the database as the logo for a particular bank. In this example, the OCR application may identify the card image as likely being a debit card associated with the particular credit card issuer.

In another example, the OCR application may identify an image that matches an image in the database of a character associated with a particular department store, such as a cartoon mascot. The OCR application may identify the card image as likely being a gift card issued by the particular department store.

In another example, the OCR application may identify a hologram that matches an image in the database that is associated with a particular credit card issuer. The OCR application may recognize the hologram by comparing multiple images from multiple angles with images in the image database. The multiple images may be obtained by extracting images from a continuous scan of the card or by capturing multiple images of the card by moving the camera to multiple angles above the card. The OCR application may identify the card as likely being a credit card issued by the particular credit card issuer associated with the hologram.

The OCR application applies an OCR algorithm to the card image to identify the information on the card. The OCR algorithm may represent any suitable process, program, method, or other manner of recognizing the digits or characters represented on the card image. The OCR application may improve the accuracy and speed of the OCR algorithm by using the information obtained in the image recognition process. For example, the OCR application may have determined that a hologram on the card image matches a hologram associated with a particular credit card company. The OCR application can use an OCR algorithm that is customized for credit cards from the particular credit card company. The OCR algorithm may be customized to look for characters in particular locations on the card image. The OCR algorithm may be customized to look for a certain number of characters. The OCR algorithm may be customized to look for certain combinations of characters. The OCR algorithm may be customized to know that the cards from the particular credit card company typically have certain data on the reverse side of the card. The OCR algorithm may be customized to know which characters are typically embossed. The OCR algorithm may be customized to look for any configured arrangements, data locations, limitations, card types, character configurations, or other suitable card data.

The OCR application extracts the relevant card information from the card image. The OCR application identifies each character and categorizes the groups of characters. For example, the OCR application may determine that a group of characters comprise a name, account number, expiration date, and other suitable categories of data. The OCR application displays the extracted data on a user interface to the user to allow the user to verify or edit the data.

The OCR algorithm may be customized to bias the results to match expected card data. In an example, the OCR algorithm has a confidence level of 60% that the first digit of the user account number is an 8 and a 40% confidence level that the first digit of the user account number is a 4. The OCR algorithm may recognize that the first digit of a credit card from the identified card issuer is typically a 4. The OCR algorithm may reject the higher confidence result and present the 4 as the best result.

In certain situations, the OCR application may display more than one set of data when the OCR application has a lower confidence in the results. That is, if the confidence level in the result is below a configured threshold, the OCR application may display the top two results for certain digits and allow the user to select the correct digit.

The OCR application supplies the extracted data to a digital wallet application module, point of sale terminal, website, or any suitable application or system that the user desires. The extracted data may be used by an application on the user computing device. The extracted data may be transmitted via an Internet connection over the network, via a near field communication ("NFC") technology, emailed, texted, or transmitted in any suitable manner.

In another example, the OCR application can apply a checksum algorithm to the extracted card information. A checksum algorithm is a mathematical procedure that is applied to a set of data for the purpose of detecting errors that may have been introduced during the OCR process. A checksum algorithm produces a result from a mathematical manipulation of the numbers that can be compared to an expected result. If the calculated result does not match the expected result, then the set of data may contain an error. If the calculated result matches the expected result, then the data is likely not to contain an error.

An example of a checksum algorithm is the Luhn algorithm. The Luhn algorithm is a checksum formula used to validate a variety of identification numbers, such as credit card numbers. The OCR application may apply the Luhn algorithm to a set of digits that are suspected of being the account number of a credit card. That is, the OCR application may extract the data from a card image, categorize a certain set of characters as a credit card number, and perform a Luhn algorithm test on the digits. If the set of digits results in an expected result, then the OCR application assesses a higher confidence that the digits were read accurately.

If the OCR application applies a checksum algorithm, such as the Luhn algorithm, and does not generate the expected result, then the OCR application may perform the OCR process on the selected digits again. The OCR application may perform the OCR process on an alternate set of digits on the card image. The OCR application may request digit entry assistance from the user. The OCR application can perform any suitable procedure upon a determination that the checksum was invalid.

The OCR application may use the Luhn algorithm to choose among various options for digits when more than one option is available for a single character. In an example, the applying of the OCR algorithm on an image of a credit card produces the following options that appear possible probabilistically:

(a) 4000 0008 0080 0002
(b) 4000 0000 0080 0002
(c) 4000 0008 0000 0002
(d) 4000 0000 0000 0002

Running the Luhn checksum on each of these possibilities will result in only (d) passing the Luhn checksum. Therefore, (d) is the most likely card number.

In another example embodiment, the OCR application uses an issuer identification number ("IIN") database to improve the data extraction process. The first two to six digits of a credit card or debit card account number are typically used as the issuer identification number. The IIN identifies the institution that issued the credit card to the card holder.

The OCR application captures an image of a card and determines the likely location of the account number. The OCR application may utilize the methods disclosed herein or any suitable method. The likely location of the account number may be based on an analysis of account number locations stored in a database or other suitable location assessable from the OCR application. The OCR application may crop the card image to isolate the account number location to allow easier analysis.

The OCR application applies an OCR algorithm or other process to identify the first six digits of the account number that typically account for the IIN. The OCR application compares the extracted digits to an IIN database.

The OCR application may access a database of IINs on the user computing device, on a storage location on a server associated with a payment processing system or an OCR system, or in any suitable storage location. The OCR application determines if the extracted digits match any of the IINs in the TIN database.

If extracted digits match any of the IINs in the IIN database, the OCR application determines from the information in the database the type of card with which the IIN is associated. For example, the OCR application may determine that the card is a credit card, debit card, stored value card, or another type of card. The OCR application may determine the issuer of the card. The OCR application may determine a financial institution associated with the card. Any other suitable information may be determined from the information associated with the database.

The OCR application employs an OCR algorithm or other computer implemented process to determine the card information. For example, the OCR application may use an OCR program to analyze the image of the card or the cropped image to extract the financial account number of a credit card. The extracted number may be presented to the user for verification, stored in the OCR application, transmitted to a remote computer, stored in a digital wallet application module, or used in any suitable manner. Other information, such as the name, expiration date, security code, or any suitable information, can also be extracted from the image.

The OCR application may improve the accuracy and speed of the OCR algorithm by using the information determined from the IIN database. For example, the OCR application may have determined that the IIN matches the IIN associated with a particular credit card company. The OCR application can use an OCR algorithm that is customized for credit cards from the particular credit card company. The OCR algorithm may be customized to look for characters in particular locations on the card image. The OCR algorithm may be customized to look for a certain number of characters. The OCR algorithm may be customized to look for certain combinations of characters. The OCR algorithm may be customized to know that the cards from the particular credit card company typically have certain data on the reverse side of the card. The OCR algorithm may be customized to know which characters are typically embossed. The OCR algorithm may be customized to look for any configured arrangements, data locations, limitations, card types, character configurations, or other suitable card data. The OCR algorithm may be customized to bias the results to match expected card data. For example, if a particular card type is identified from the IIN database, the information from the database may provide the user identification number arrangement for that card type. The database may indicate that a particular credit card issuer uses a 16 digit user identification number while another credit card issuer may use a 15 digit user identification number. The OCR algorithm may use the digit arrangement to improve the accuracy of the OCR algorithm.

If the OCR application does not identify a match in the IIN database then the OCR application may perform the OCR process on the selected characters again. The OCR application may perform the OCR process on an alternate set of characters on the card image. The OCR application may determine that a customized OCR algorithm is not available for the extracted IIN and use a general OCR algorithm. The OCR application may request IIN number assistance from the user. The OCR application can perform any suitable procedure upon a determination that the IIN is not matched in the IIN database.

In another example, the OCR application analyses user data before or after applying an OCR algorithm to the card image. The OCR application can obtain data from one or more sources on the user computing device or other suitable locations. For example, the user may provide the OCR application access to a list of names on a contact list of the user on the user computing device, in a cloud computing environment, on a server system, or in any suitable location. The user may provide the OCR application access to other accounts of the user, such as a social network account, an email account, or other suitable accounts.

The OCR application may use the sources of names to customize the OCR algorithm to make the OCR process more accurate. The OCR application may use the names from the lists as a bias in the OCR process. That is, if the OCR algorithm has generated two possible last names for the user, the OCR algorithm may determine if either of the candidate names is represented in the user data and select that name. If a name with a particular spelling is represented in the user data, the OCR algorithm may interpret that entry as an indication that the name of the user is also spelled in the same manner and bias the results of the OCR algorithm to reflect that spelling.

The OCR algorithm may use the names extracted for other card accounts of the user and the names associated with other user accounts as a bias for the OCR process. The OCR algorithm may access the names associated with other accounts in the digital wallet application module or in another account application.

The OCR algorithm may use the data to verify the extracted data or to provide a bias for the OCR algorithm. If the OCR application does not identify a match in the user data then the OCR application may perform the OCR process on the selected characters again. The OCR application may perform the OCR process on an alternate set of characters on the card image. The OCR application may request user data assistance from the user.

Example System Architecture

Turning now to the drawings, in which like numerals represent like (but not necessarily identical) elements throughout the figures, example embodiments are described in detail.

FIG. 1 is a block diagram depicting a system for extracting financial account information with relaxed card alignment and for extracting financial account information from multiple cards, in accordance with certain example embodiments. As depicted in FIG. 1, the system 100 includes network computing devices 110, 120, 140, and 170 that are configured to communicate with one another via one or more networks 105. In some embodiments, a user associated with a device must install an application and/or make a feature selection to obtain the benefits of the techniques described herein.

Each network 105 includes a wired or wireless telecommunication means by which network devices (including devices 110, 120, 140, and 170) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network computing device 110, 120, 140, and 170 includes a device having a communication module capable of transmitting and receiving data over the network 105. For example, each network device 110, 120, 140, and 170 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 120, 140, and 170 are operated by end-users or consumers, OCR system operators, and payment processing system operators, and card issuer operators, respectively.

The user 101 can use the communication application 112, which may be, for example, a web browser application or a stand-alone application, to view, download, upload, or otherwise access documents or web pages via a distributed network 105. The network 105 includes a wired or wireless telecommunication system or device by which network devices (including devices 110, 120, 140, and 170) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages.

The user device 110 may employ a communication module 112 to communicate with the web server 124 of the OCR system 120 or other servers. The communication module 112 may allow devices to communicate via technologies other than the network 105. Examples might include a cellular network, radio network, or other communication network.

The user computing device 110 may include a digital wallet application module 111. The digital wallet application module 111 may encompass any application, hardware, software, or process the user device 110 may employ to assist the user 101 in completing a purchase. The digital wallet application module 111 can interact with the communication application 112 or can be embodied as a companion application of the communication application 112. As a companion application, the digital wallet application module 111 executes within the communication application 112. That is, the digital wallet application module 111 may be an application program embedded in the communication application 112.

The user device 110 may include an optical character recognition ("OCR") application 115. The OCR application 115 may interact with the communication application 112 or be embodied as a companion application of the communication application 112 and execute within the communication application 112. In an exemplary embodiment, the OCR application 115 may additionally or alternatively be embodied as a companion application of the digital wallet application module 111 and execute within the digital wallet application module 111. The OCR application 115 may employ a software interface that may open in the digital wallet application 111 or may open in the communication application 112. The interface can allow the user 101 to configure the OCR application 115.

The OCR application 115 may be used to analyze a card and extract information or other data from the card. The OCR system 120 or other system that develops the OCR algorithms or other methods may include a set of computer-readable program instructions, for example, using JavaScript, that enable the OCR system 120 to interact with the OCR application 115.

Any of the functions described in the specification as being performed by the OCR application 115 can be performed by the payment processing system 140, the OCR system 120, the user computing device 110, the digital wallet application module 111, a merchant system (not pictured) or any other suitable hardware or software system or application. In an example, the OCR application 115 on the user computing device 110 may obtain an image of a card 102 and transmit the image to the OCR system 120 to extract the information on the card 102.

The user device 110 includes a data storage unit 113 accessible by the OCR application 115, the web browser application 112, or any suitable computing device or application. The exemplary data storage unit 113 can include one or more tangible computer-readable media. The data storage unit 113 can be stored on the user device 110 or can be logically coupled to the user device 110. For example, the data storage unit 113 can include on-board flash memory and/or one or more removable memory cards or removable flash memory.

The user device 110 may include a camera 114. The camera may be any module or function of the user computing device 110 that obtains a digital image. The camera 114 may be onboard the user computing device 110 or in any manner logically connected to the user computing device 110. The camera 114 may be capable of obtaining individual images or a video scan. Any other suitable image capturing device may be represented by the camera 114.

The user device 110 may include user applications 116. The user applications 116 may be contact applications, email applications, digital wallet applications, or any applications that may employ the name of the user and/or names of acquaintances of the user. The user may provide permission to the OCR application 115 to access the names and other data from the user applications 116. The OCR application 115 may use the data from the user applications 116 to verify or improve the OCR process.

The payment processing system 140 includes a data storage unit 147 accessible by the web server 144. The example data storage unit 147 can include one or more tangible computer-readable storage devices. The payment processing system 140 is operable to conduct payments between a user 101 and a merchant system (not pictured).

The payment processing system 140 is further operable to manage a payment account of a user 101, maintain a database to store transactions of the merchant system and the user 101, verify transactions, and other suitable functions.

The user 101 may use a web server 144 on the payment processing system 140 to view, register, download, upload, or otherwise access the payment processing system 140 via a website (not illustrated) and a communication network 105). The user 101 associates one or more registered financial card accounts, including bank account debit cards, credit cards, gift cards, loyalty cards, coupons, offers, prepaid offers, store rewards cards, or other type of financial account that can be used to make a purchase or redeem value-added services with a payment account of the user 101.

A card issuer, such as a bank or other institution, may be the issuer of the financial account being registered. For example, the card issuer may be a credit card issuer, a debit card issuer, a stored value issuer, a financial institution providing an account, or any other provider of a financial account. The payment processing system 140 also may function as the issuer for the associated financial account. The user's 101 registration in formation is saved in the payment processing system's 140 data storage unit 147 and is accessible the by web server 144. The card issuer employs a card issuer system 170 to issue the cards, manage the user account, and perform any other suitable functions. The card issuer system 170 may alternatively be an issue cards used for identification, access, verification, ticketing, or cards for any suitable purpose.

The OCR system 120 utilizes an OCR system web server 124 operating a system that produces, manages, stores, or maintains OCR algorithms, methods, processes, or services. The OCR system web server 124 may represent the computer-implemented system that the OCR system 120 employs to provide OCR services to user computing devices 110, merchant computing systems, or any suitable entity. The OCR system web server 124 can communicate with one or more payment processing systems 140, a user device 110, or other computing devices via any available technologies. Such technologies may include, for example, an Internet connection via the network 105, email, text, instant messaging, or other suitable communication technologies. The OCR system 120 may include a data storage unit 127 accessible by the web server 124 of the OCR system 120. The data storage unit 127 can include one or more tangible computer-readable storage devices.

Any of the functions described in the specification as being performed by the OCR system 120 can be performed by the OCR application 115, the user computing device 110, or any other suitable hardware or software system or application.

Throughout the specification, the general term "card" will be used to represent any type of physical card instrument, such as the payment account card 102. In example embodiments, the different types of card 102 represented by "card" 102 can include credit cards, debit cards, stored value cards, loyalty cards, identification cards, or any other suitable card representing an account of a user 101 or other information thereon.

The user 101 may employ the card 102 when making a transaction, such as a purchase, ticketed entry, loyalty check-in, or other suitable transaction. The user 101 may obtain the card information for the purpose of importing the account represented by the card 102 into a digital wallet application module 111 of a computing device 110 or for other digital account purposes. The card 102 is typically a plastic card containing the account information and other data on the card 102. In many card 102 embodiments, the customer name, expiration date, and card numbers are physically embossed on the card 102. The embossed information is visible from both the front and back of the card 102, although the embossed information is typically reversed on the back of the card 102.

It will be appreciated that the network connections shown are exemplary and other means of establishing a communications link between the computers and devices can be used. Moreover, those having ordinary skill in the art having the benefit of the present disclosure will appreciate that the user device 110, OCR system 120, payment processing system 140, and card issuer system 170 illustrated in FIG. 1 can have any of several other suitable computer system configurations. For example, a user device 110 embodied as a mobile phone or handheld computer may not include all the components described above.

Example Processes

The example methods illustrated in FIGS. 2-8 are described hereinafter with respect to the components of the example operating environment 100. The example methods of FIGS. 2-8 may also be performed with other systems and in other environments.

Figure 2:
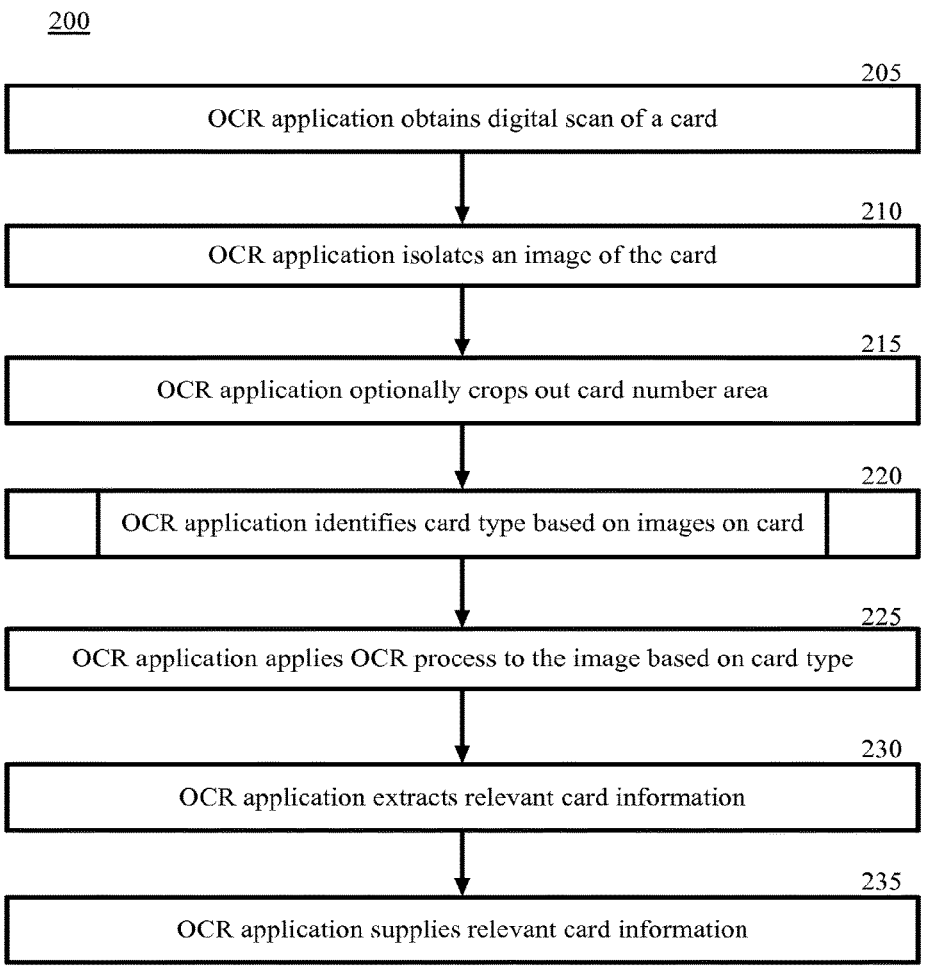
FIG. 2 is a block flow diagram depicting methods for extracting financial account information using card art, in accordance with certain example embodiments.

FIG. 2 is a block flow diagram depicting a method 200 for extracting financial account information using card art, in accordance with certain exemplary embodiments.

With reference to FIGS. 1 and 2, in block 205, optical character recognition ("OCR") application 115 on the user device 110 obtains a digital scan or image of a card 102. The user 101 employs a mobile phone, digital camera, or other user computing device 110 to capture an image of the card 102 associated with the account that the user 101 desires to input into the user computing device 110.

An OCR application 115 on a user computing device 110 receives the image of the card 102. The image may be obtained from the camera module of a user computing device 110, such as the camera 114 on a mobile phone. The image may be obtained from a scanner coupled to the user computing device 110 or any other suitable digital imaging device. The image may be obtained from video captured by the user computing device 110. The image may be accessed by the OCR application 115 on the user computing device 110 from a storage location on the user computing device 110, from a remote storage location, or from any suitable location. All sources capable of providing the image will be referred to herein as a "camera" 114.

An OCR application 115 receives the image of the card from the camera. The functions of the OCR application 115 may be performed by any suitable module, hardware, software, or application operating on the user computing device. Some, or all, of the functions of the OCR application 115 may be performed by a remote server or other computing device, such as the server operating in an OCR system 120. For example, a digital wallet application module 111 on the user computing device 110 may obtain the image of the card and transmit the image to the OCR system 120 for processing. In another example, some of the OCR functions may be conducted by the user computing device 110 and some by the OCR system 120 or another remote server. Examples provided herein may indicate that many of the functions are performed by an OCR application 115 on the user computing device 110, but some or all of the functions may be performed by any suitable computing device.

The image is presented on the user interface of the user computing device 110 as a live video image of the card 102 or a single image of the card 102. The OCR application 115 can isolate and store one or more images from the video feed of the camera 114. For example, the user 101 may hover the camera 114 function of a user computing device 110 over a card and observe the representation of the card on the user interface of the user computing device 110. An illustration of the card 102 displayed on the user computing device is presented in FIG. 9.

Figure 9:
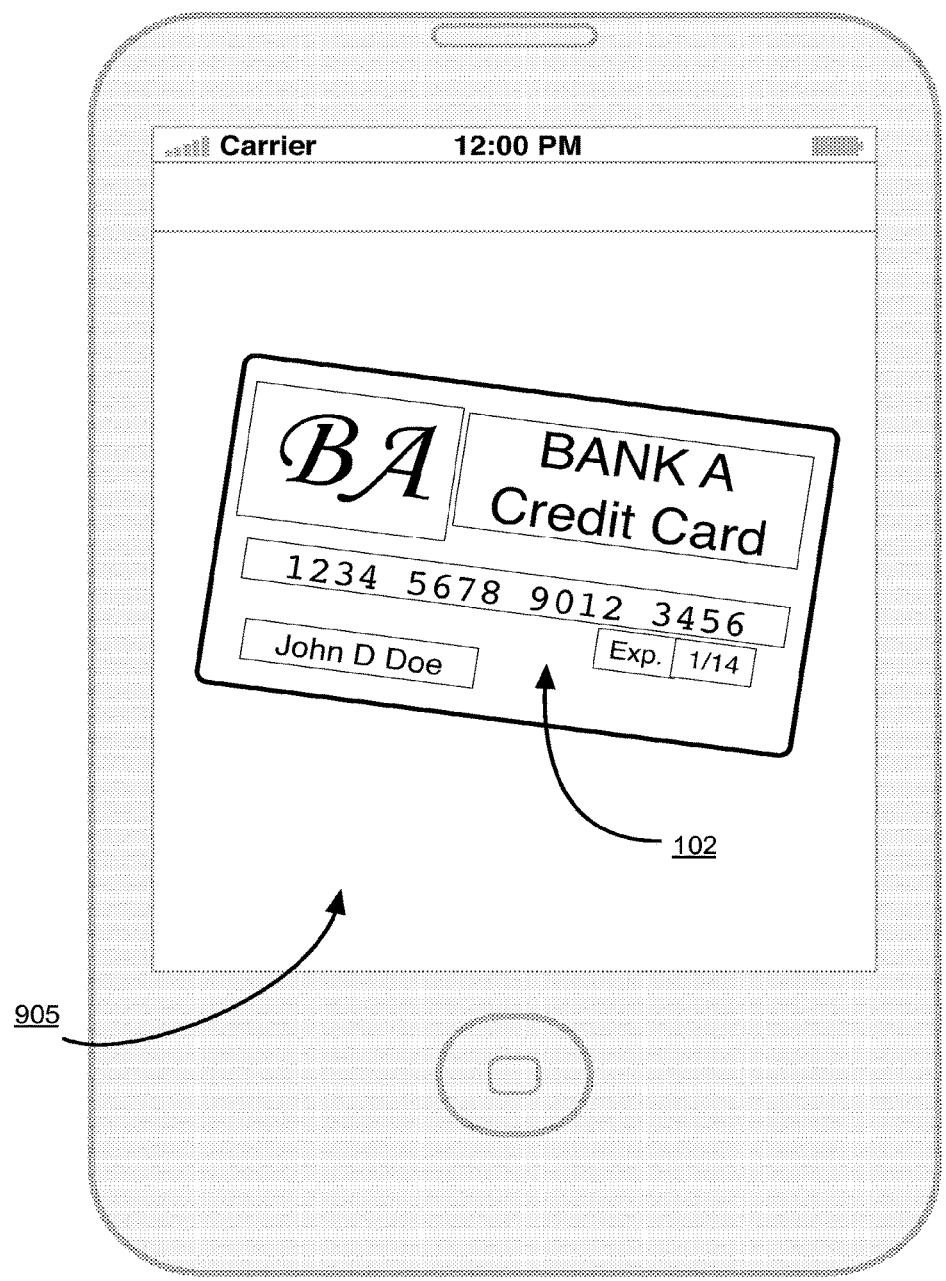
FIG. 9 is an illustration of a user computing device displaying an image of a financial card, in accordance with certain example embodiments.

FIG. 9 is an illustration of a user computing device 110 displaying an image of a financial card, in accordance with certain example embodiments. The user computing device 110 is shown as a mobile smartphone. The user computing device 110 is shown with a display screen 905 as a user interface. The card 102 is shown displayed on the user computing device 110.

Returning to FIG. 2, in block 210, the OCR application 115 isolates the image of the card. Any image data manipulation or image extraction may be used to isolate the card image.

The OCR application 115, the camera 114 module, or the user computing device 110, or other computing device performs blur detection on the image. The image may be recognized as blurry, overly bright, overly dark, or otherwise obscured in a manner that prevents a high resolution image from being obtained. The OCR application 115, or other computing device, may adjust the image capturing method to reduce the blur in the image. For example, the OCR application 115 may direct the camera 114 to adjust the focus on the financial card. In another example, the OCR application 115 may direct the user to move the camera 114 closer to, or farther away from, the financial card. In another example, the OCR application 115 may perform a digital image manipulation to remove the blur. Any other suitable method of correcting a blurred image can be utilized.

In block 215, the OCR application 115 may crop the image to display only the desired information from the card 102. For example, if the card 102 in the image is a credit card, the OCR application 115 accesses information associated with the expected location of the account number of a credit card. The expected location may be obtained from a database of card layouts stored on the user computing device 110 or in another suitable location. Credit cards, driver's licenses, loyalty cards, and other cards typically meet an industry standard for the data locations and the layout of the card. The industry standards may be stored in the OCR application 115 or in a location accessible by the OCR application 115. In certain circumstances, the data locations may be provided by the issuer of the card 102.

In block 220, the OCR system 120 or another computing device identifies the card type based on images on the card 102.

The details of the method of block 220 are described in greater detail hereinafter with reference to FIG. 3.

FIG. 3 is a block flow diagram depicting methods for identifying card types based on images on cards, in accordance with certain example embodiments, as referenced in block 220 of FIG. 2.

In block 305, the OCR application 115 performs an image recognition algorithm on the card image. In the example embodiment, the image recognition is performed by the OCR application 115 on the user computing device 110. In another example, the OCR application 115 transmits the image to the OCR system 120 or another suitable computing device for the image recognition.

The OCR application 115 may use any suitable algorithm, process, method, or other manner of recognizing card images. For example, the OCR application 115 may isolate images, such as card art, within the image of the card. The OCR application 115 may apply an OCR algorithm to one or more words identified in the card art. That is, if the image recognition algorithm recognizes that a word is represented in the card art, then an OCR algorithm may be used to identify the word. For example, a logo of the card issuer 170 may contain a name or other word. The employed OCR algorithm may be a function of the image recognition algorithm, a separate OCR algorithm, or the OCR algorithm used to interpret the user financial information.

In block 310, the OCR application 115 compares the card art images to a stored database of images to identify matching images. The OCR application 115 identifies images, logos, words, icons, pictures, badges, and other features of the art on the card image. The card art is compared to a database storing images associated with card issuers 170. The stored card art may be supplied by card issuers 170 or obtained from any suitable source. For example, the stored card art may be obtained from websites associated with the card issuers or another suitable website. The stored card art may be supplied by a third party card art provider. Any suitable source for card art may be used. The stored card art may be maintained in a database stored on data storage unit 113, OCR system data storage unit 127, or another suitable computing device or data storage unit.

In block 315, the OCR application 115 identifies matches between the card art and the stored images in the database. For example, a particular logo in the card art may be a match to a logo in the stored images to a level of confidence over a configured threshold.

In block 320, the OCR application 115 extracts the identity the card art image from the information associated with a matching image in the database. For example, when the OCR application 115 compares the identified art to the database of images and locates a matching image, the OCR application accesses any data stored with the matching image. The stored data may be information about the card issuer 170, information about the issued card, a category of the card, or any suitable information.

The data stored with the matching images may include an identification of the card type. For example, the OCR application 115 may identify a logo on the card image that matches a logo in the database. The logo may be identified in the database as the logo for a particular bank. In this example, the card image may be identified as likely being a debit card associated with the particular credit card issuer.

In another example, the OCR application 115 may identify an image that matches an image in the database of a character associated with a particular department store, such as a cartoon mascot. In this example, the card image may be identified as likely being a gift card issued by the particular department store.

In another example, the OCR application 115 may identify a hologram that matches an image in the database that is associated with a particular credit card issuer. The OCR application 115 may recognize the hologram by comparing multiple images from multiple angles with images in the image database. The multiple images may be obtained by extracting images from a continuous scan of the card or by capturing multiple images of the card by moving the camera to multiple angles above the card. The card image may be identified as likely being a credit card issued by the particular credit card issuer associated with the hologram.

From block 320, the method 220 returns to block 225 in FIG. 2.

In block 225, the OCR application 115 applies an OCR algorithm to the card image to identify the information on the card 102. The OCR algorithm may represent any suitable process, program, method, or other manner of recognizing the digits or characters represented on the card image. The accuracy and speed of the OCR algorithm may be improved by using the information obtained in the image recognition process. For example, the OCR application may have determined that a hologram on the card image matches a hologram associated with a particular credit card company. An OCR algorithm may be used that is customized for credit cards from the particular credit card company. The OCR algorithm may be customized to look for characters in particular locations on the card image. The OCR algorithm may be customized to look for a certain number of characters. The OCR algorithm may be customized to look for certain combinations of characters. The OCR algorithm may be customized to know that the cards from the particular credit card company typically have certain data on the reverse side of the card 102. The OCR algorithm may be customized to know which characters are typically embossed. The OCR algorithm may be customized to look for any configured arrangements, data locations, limitations, card types, character configurations, or other suitable card data.

In block 230, the OCR application 115 extracts the information, such as the user identification number from the image of the card 102. Other information, such as the name, expiration date, security code, or any suitable information, may also be extracted from the image.

The OCR application 115 extracts the relevant card information from the card image. The OCR application 115 identifies each character and categorizes the groups of characters. For example, the OCR application 115 may determine that a group of characters comprise a name, account number, expiration date, and other suitable categories of data. The OCR application 115 displays the extracted data on a user interface to the user 101 to allow the user 101 to verify or edit the data.

The OCR algorithm may be customized to bias the results to match expected card data. In an example, the OCR algorithm has a confidence level of 60% that the first digit of the user account number is an 8 and a 40% confidence level that the first digit of the user account number is a 4. The OCR algorithm may recognize that the first digit of a credit card from the identified card issuer is typically a 4. The OCR algorithm may reject the higher confidence result and present the 4 as the best result.

In certain situations, the OCR application 115 may display more than one set of data when the OCR application 115 has a lower confidence in the results. That is, if the confidence level in the result is below a configured threshold, the OCR application 115 may display the top two results for certain digits and allow the user 101 to select the correct digit. The user 101 may signal a selection by actuating a real or virtual button, tapping the selected digits, or performing any suitable action.

In an example embodiment, the OCR application 115 displays the extracted data on the user interface screen of the user computing device 110 to allow easier verification for the user 101. The extracted data may be superimposed on the image of the card 102. The extracted data may be placed directly on the associated data in the image or in a position near the data in the image. The extracted data may be displayed in a contrasting color to allow for better visibility. For example, if the card image is a dark color, then the extracted data may be displayed in a white font. All of the extracted data may be displayed on the user interface at the same time. Alternatively, a portion of the extracted data may be displayed. After verification by the user 101, the next portion of the extracted data may be displayed.

For example, the extracted account identification number may be displayed just above the location of the account identification number in the image. Such a placement would allow the user 101 to verify that the number was extracted correctly quickly and easily. The user 101 would be allowed to verify each number in such a side by side comparison. The user 101 may verify the extracted data by selecting a real or virtual button to confirm the data as matching the card information. Any suitable action may be taken by the user 101 to signal verification.

The OCR application 115 may allow the user 101 to highlight, mark, or otherwise identify digits that are not correct. For example, if the name is extracted with an incorrect letter, the user 101 may tap the incorrect letter. The OCR application 115 may take any suitable corrective action after the incorrect letter is identified, such as performing the OCR algorithm again, requesting a corrected digit from the user 101, or any suitable action.

In block 235, the OCR application 115 supplies the extracted data to a digital wallet application module 111, point of sale terminal, payment processing system 140, website, or any suitable application or system that the user desires. The extracted data may be used by an application on the user computing device 110. The extracted data may be transmitted via an Internet connection over the network 105, via a near field communication ("NFC") technology, emailed, texted, or transmitted in any suitable manner.

Figure 4:
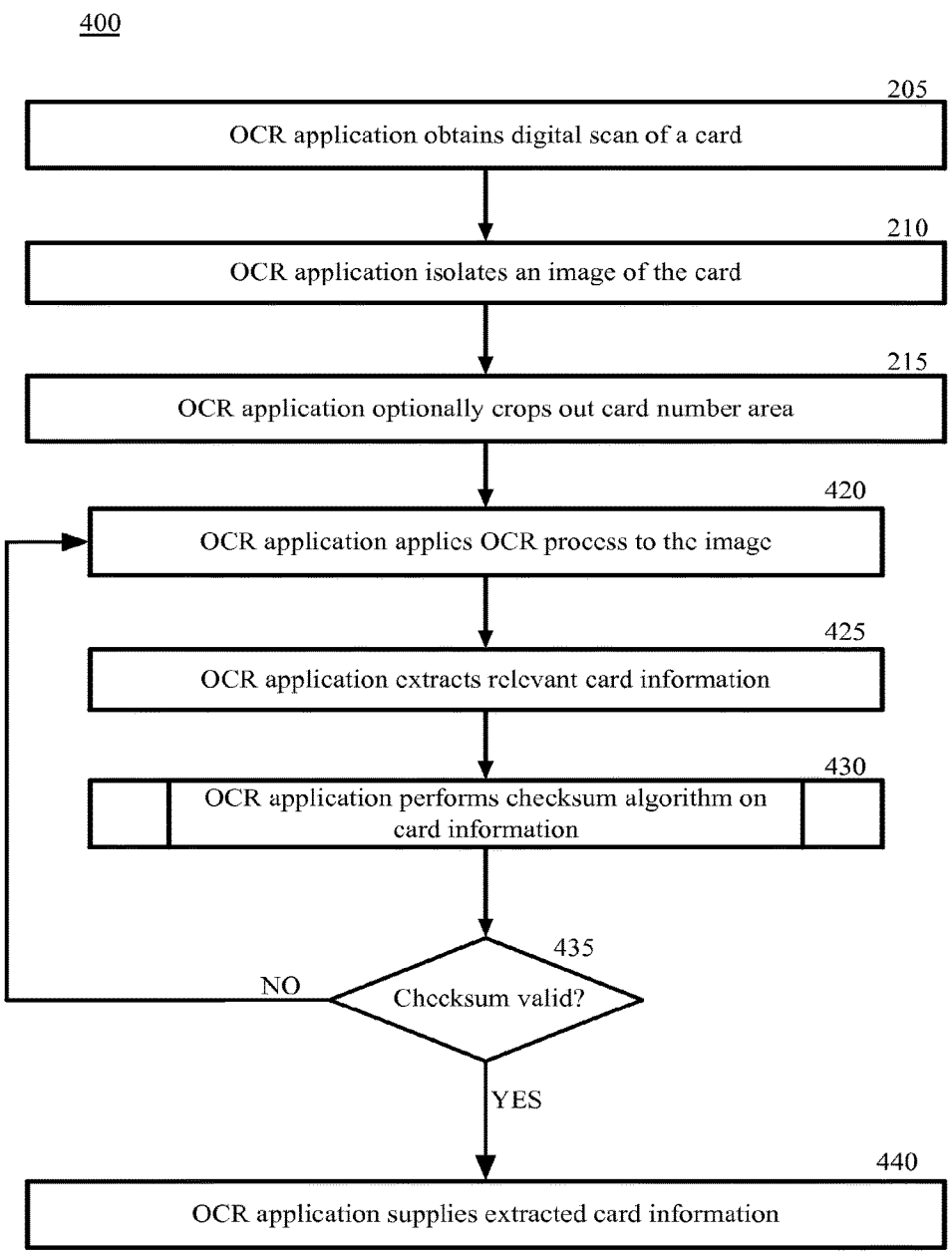
FIG. 4 is a block flow diagram depicting methods for extracting financial account information using a checksum algorithm, in accordance with certain example embodiments.

FIG. 4 is a block flow diagram depicting a method 400 for extracting financial account information using a checksum algorithm, in accordance with certain example embodiments.

Blocks 205, 210, and 215 are substantially similar to blocks 205, 210, and 215 of FIG. 2 as described herein.

In block 420, the OCR application 115 performs the OCR algorithm to the card image. The OCR algorithm may represent any suitable process, program, method, or other manner of recognizing the digits or characters represented on the card image.

In block 425, the OCR application 115 extracts the information, such as the user identification number from the image of the card 102. Other information, such as the name, expiration date, security code, or any suitable information, may also be extracted from the image.

In block 430, the OCR application 115 performs a checksum algorithm on the card information. The details of block 430 are described in greater detail herein after with reference to FIG. 5.

Figure 5:
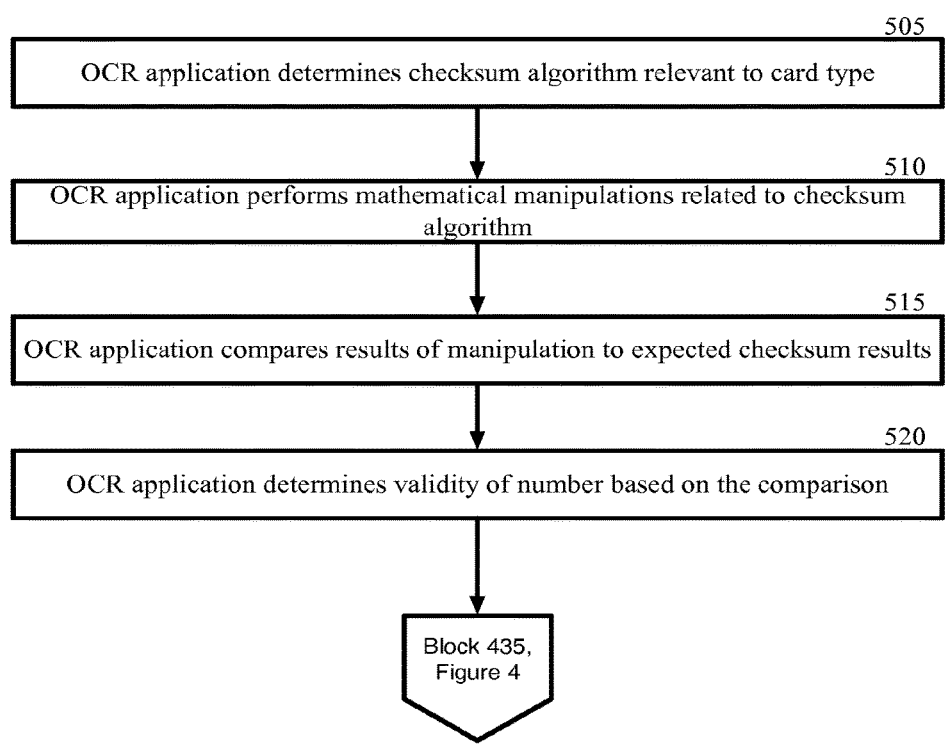
FIG. 5 is a block flow diagram depicting methods for performing a checksum algorithm on extracted information, in accordance with certain example embodiments.

FIG. 5 is a block flow diagram depicting methods for performing a checksum algorithm on extracted information, in accordance with certain example embodiments, as referenced in block 430 of FIG. 4.

In block 505, the OCR application 115 determines a checksum algorithm relevant to the card type. A checksum algorithm is a mathematical procedure that is applied to a set of data for the purpose of detecting errors that may have been introduced during the OCR process. A checksum algorithm produces a result from a mathematical manipulation of the numbers that can be compared to an expected result. If the calculated result does not match the expected result, then the set of data may contain an error. If the calculated result matches the expected result, then the data is likely not to contain an error.

The OCR application 115 may determine the type of card being analyzed. For example, the user 101 may input a selection of credit card or debit card when the OCR application 115 is first initiated. The card type may be determined based on the appearance of the card image. The OCR application 115 may only be configured to be used for particular card types. In an example, the OCR application 115 may extract the data from a card image and categorize a certain set of characters as likely being a credit card number. Any manner of determining the card type may be employed. The OCR application 115 accesses a checksum algorithm for the particular card type from a database of checksum algorithms.

In block 510, the OCR application 115 performs mathematical manipulations related to checksum algorithm. An example of a checksum algorithm is the Luhn algorithm. The Luhn algorithm is a checksum formula used to validate a variety of identification numbers, such as credit card numbers. The OCR application 115 may perform the Luhn algorithm on a set of digits that are suspected of being the account number of a credit card. That is, the OCR application 115 may extract the data from a card image, categorize a certain set of characters as a credit card number, and perform a Luhn algorithm test on the digits.

In block 515, the OCR application 115 compares results of manipulation to expected checksum results. That is, with an accurate card number, the checksum mathematical manipulation will produce results that meet the expected results.

In an example, the OCR application 115 may use the Luhn algorithm to choose among various options for digits when more than one option is available for a single character. In an example, the performing of the OCR algorithm on an image of a credit card 102 produces the following options that appear possible probabilistically:

(a) 4000 0008 0080 0002
(b) 4000 0000 0080 0002
(c) 4000 0008 0000 0002
(d) 4000 0000 0000 0002

Running the Luhn checksum on each of these possibilities will result in only (d) passing the Luhn checksum. Therefore, (d) is the most likely card number.

In block 520, the OCR application 115 determines validity of the extracted data based on the comparison. That is, the OCR application 115 determines if the result of the checksum meets the expected result.

From block 520, the method 430 returns to block 435 of FIG. 4.

Returning to FIG. 4, in block 435, the method 400 determines if the result of the checksum algorithm was valid. If a result was a valid number, then the method 400 follows the "YES" branch of block 435 to block 440. If the result was an invalid number, then the method 400 follows the "NO" branch of block 435 to block 420.

Following the NO branch to block 420, the method 400 may reapply the OCR algorithm and perform the checksum algorithm again as described herein in blocks 420, 425, and 430. The OCR application 115 may perform the OCR process on an alternate set of digits on the card image. The OCR application 115 may request digit entry assistance from the user 101. The OCR application 115 may perform any suitable procedure upon a determination that the checksum was invalid.

Following the YES branch to block 440, the OCR application 115 supplies the extracted data to a digital wallet application module 111, point of sale terminal, payment processing system 140, website, or any suitable application or system that the user desires. The extracted data may be used by an application on the user computing device 110. The extracted data may be transmitted via an Internet connection over the network 105, via a near field communication ("NFC") technology, emailed, texted, or transmitted in any suitable manner.

Figure 6:
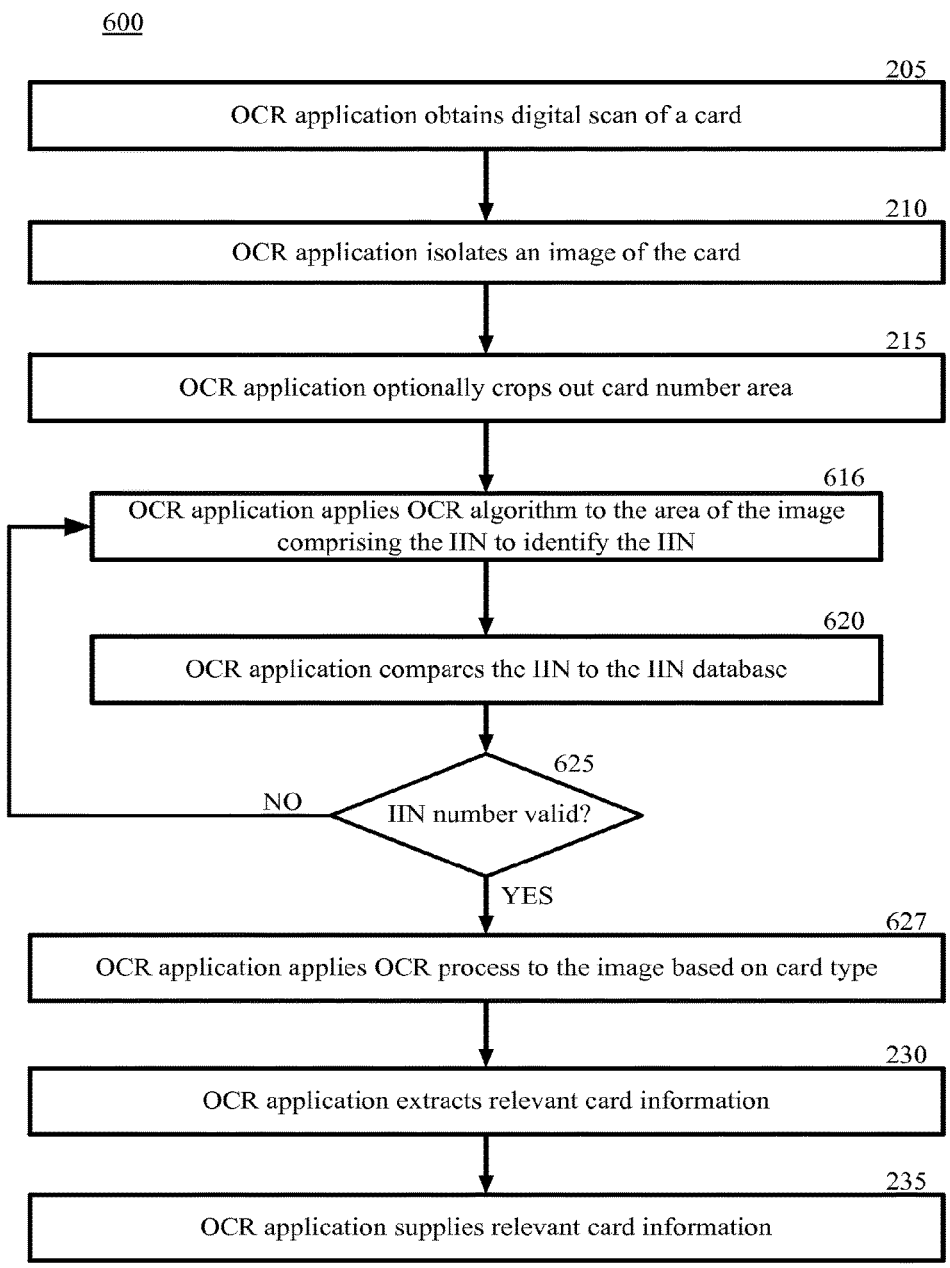
FIG. 6 is a block flow diagram depicting for extracting financial account information using the IIN database, in accordance with certain example embodiments.

FIG. 6 is a block flow diagram depicting a method 600 for extracting financial account information using the IIN database, in accordance with certain example embodiments.

Blocks 205, 210, and 215 of FIG. 6 are substantially similar to blocks 205, 210, and 215 of FIG. 2 as described herein.

In block 616, the OCR application 115 performs the OCR algorithm on the area of the image comprising an issuer identification number ("IIN") to identify the IIN on the card 102. The first two to six digits of a credit card or debit card account number are typically used as the issuer identification number. The IIN identifies the card issuer 170 that issued the card 102 to the card holder.

The OCR application 115 captures an image of a card and determines the likely location of the account number. The OCR application 115 may utilize the methods disclosed herein or any suitable method. The likely location of the account number may be based on an analysis of account number locations stored in a database or other suitable location assessable from the OCR application 115. The OCR application 115 may crop the card image to isolate the account number location to allow easier analysis.

The OCR application 115 performs an OCR algorithm other process to identify the first six digits of the account number that typically account for the IIN. The OCR application 115 may use information known about the user 101 to improve the accuracy of the process. For example, the OCR application 115 may have stored information such as the location of residence of the user 101. In the example, the OCR application 115 may limit the search of the IIN database to a group of IINs that are associated with the location of the user 101. That is, if the user 101 resides in the United States, the OCR application 115 may only search a database of IINs that are associated with cards valid in the United States. If the OCR application 115 has stored information that the user only uses debit cards, then the OCR application 115 may only search a database of IINs that are associated with debit cards. Any other data associated with the user 101 may be used to improve the IIN database search and the matching process.

In another example, the OCR application 115 may perform an image recognition algorithm on the image. The image recognition algorithm may be performed in a similar manner as the method 200 described herein. The image recognition algorithm may determine that the card 102 in the image was issued by a particular card issuer 170. For example, the card 102 may be identified as being a credit card from a particular credit card issuer 170. The OCR application 115 may limit the available IINs that are possible for the image based on the identified card type. A smaller list of possible IINs may allow the OCR application 115 to more accurately determine the IIN of the card 102 in the image.

In block 620, the OCR application 115 compares the extracted digits to an IIN database. The OCR application 115 may access a database of IINs on the user computing device 110, on a storage location on a server associated with a payment processing system 140 or an OCR system 120, or in any suitable storage location. The OCR application 115 determines if the extracted digits match any of the IINs in the IIN database. If a match exists, then the IIN number is determined to be valid.

If a result was a valid number, then the method 600 follows the "YES" branch of block 625 to block 627. If the result was an invalid number, then the method 600 follows the "NO" branch of block 625 to block 616.

Following the NO branch to block 616, the method 600 may perform the OCR algorithm again as described herein in blocks 616 and 620. The OCR application 115 may perform the OCR process on an alternate set of digits on the card image. The OCR application 115 may request digit entry assistance from the user 102. The OCR application 115 may determine that a customized OCR algorithm is not available for the extracted IIN and use a general OCR algorithm. The OCR application 115 may request IIN number assistance from the user. The OCR application 115 may perform any suitable procedure upon a determination that the IIN is not matched in the IIN database.

If the OCR application does not identify a match in the IIN database then the OCR application may perform the OCR process on the selected characters again. The OCR application may perform the OCR process on an alternate set of characters on the card image.

Following the YES branch to block 627, the OCR application 115 performs the OCR algorithm on the full image based on the card type identified from the IIN database. If extracted digits match any of the IINs in the IIN database, the OCR application 115 determines from the information in the database the type of card 102 with which the IIN is associated. For example, the OCR application 115 may determine that the card 102 is a credit card, debit card, stored value card, or another type of card. The OCR application 115 may determine the issuer of the card 102. The OCR application 115 may identify a financial institution associated with the card 102. Any other suitable information may be determined from the information associated with the database.

The OCR application 115 employs an OCR algorithm or other computer implemented process to determine the card information. For example, the OCR application 115 may use an OCR program to analyze the image of the card 102 or the cropped image to extract the financial account number of a credit card. Other information, such as the name, expiration date, security code, or any suitable information, may be extracted from the image.

The OCR application 115 may improve the accuracy and speed of the OCR algorithm by using the information determined from the IIN database. For example, the OCR application 115 may have determined that the TIN matches the IIN associated with a particular credit card company. The OCR application 115 may use an OCR algorithm that is customized for credit cards from the particular credit card company. The OCR algorithm may be customized to look for characters in particular locations on the card image. The OCR algorithm may be customized to look for a certain number of characters. The OCR algorithm may be customized to look for certain combinations of characters. The OCR algorithm may be customized to know that the cards from the particular credit card company typically have certain data on the reverse side of the card. The OCR algorithm may be customized to know which characters are typically embossed. The OCR algorithm may be customized to look for any configured arrangements, data locations, limitations, card types, character configurations, or other suitable card data. The OCR algorithm may be customized to bias the results to match expected card data. For example, if a particular card type is identified from the IIN database, the information from the database may provide the user identification number arrangement for that card type. The database may indicate that a particular credit card issuer uses a 16 digit user identification number while another credit card issuer may use a 15 digit user identification number. The OCR algorithm may use the digit arrangement to improve the accuracy of the OCR algorithm.

Blocks 230 and 235 of FIG. 6 are substantially similar to blocks 230 and 235 of FIG. 2.

Figure 7:
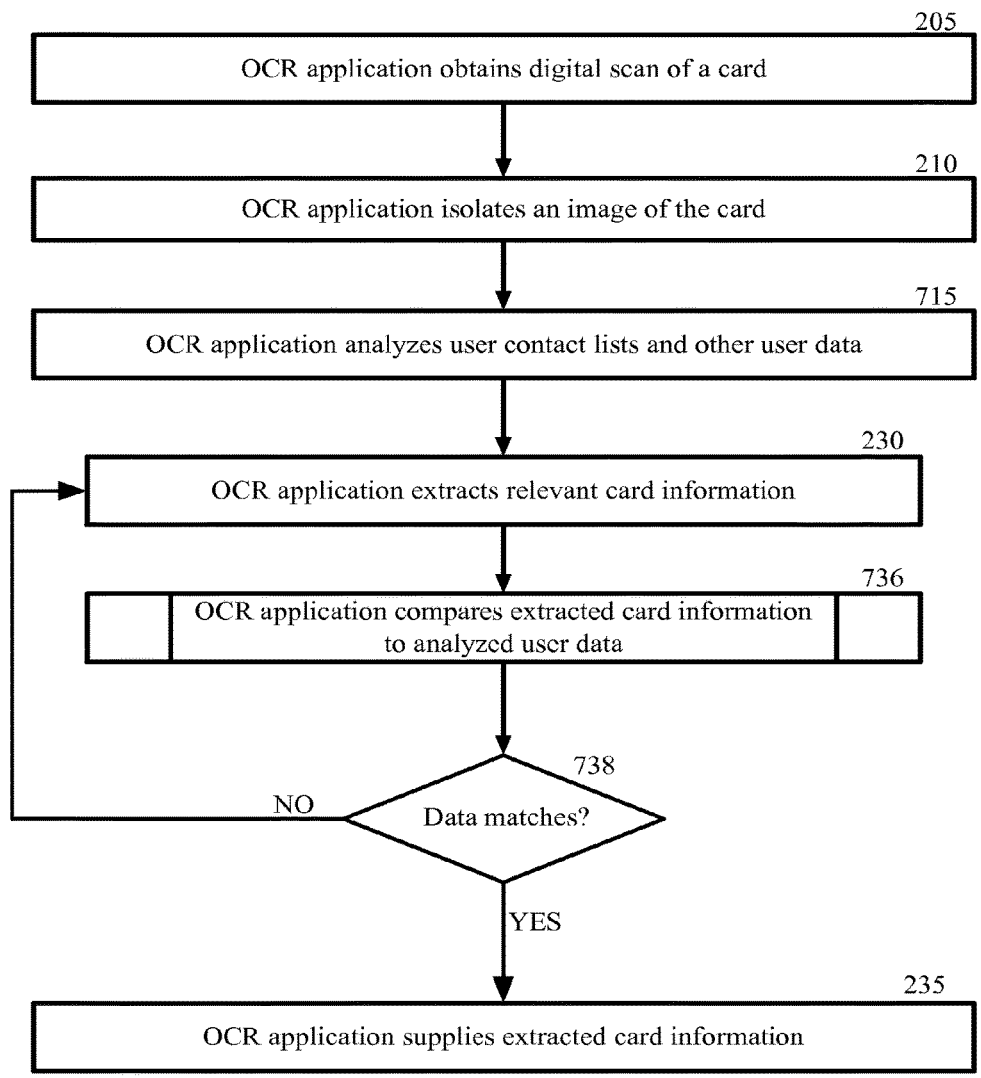
FIG. 7 is a block flow diagram depicting methods for comparing extracted card information to analyzed user data, in accordance with certain example embodiments.

FIG. 7 is a block flow diagram depicting a method 7 for comparing extracted card information to analyzed user data, in accordance with certain example embodiments.

Blocks 205 and 210 of FIG. 7 are substantially similar to blocks 205 and 210 of FIG. 2 as described herein.

In block 715, the OCR application 115 analyses user applications 116, such as user contact lists and other data, before or after applying an OCR algorithm to the card image. The OCR application 115 can obtain data from one or more sources on the user computing device 110 or other suitable locations. For example, the user 101 may provide the OCR application 115 access to a list of names on a contact list of the user 101 on the user computing device 110, in a cloud computing environment, on a server system, or in any suitable location. The user 101 may provide the OCR application 115 access to other accounts of the user 101, such as a social network account, an email account, or other suitable accounts.

In block 235, the OCR application extracts relevant card information as described in block 235 of FIG. 2.

In block 736, the OCR application 115 compares extracted card information to analyzed user data. Block 736 is described in greater detail hereinafter with reference to FIG. 8.

Figure 8:
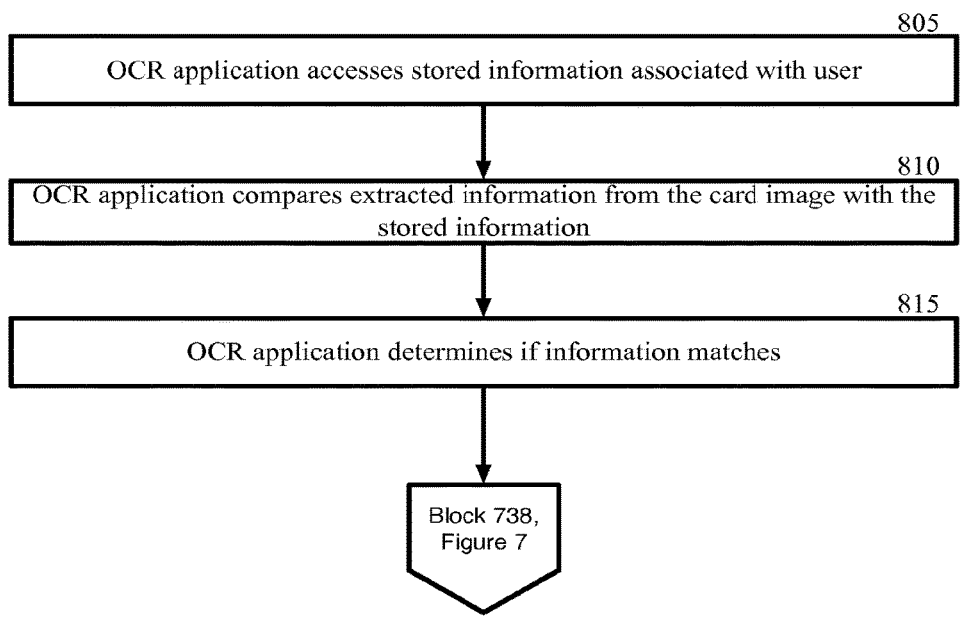
FIG. 8 is a block flow diagram depicting methods for extracting financial account information using user data, in accordance with certain example embodiments.

FIG. 8 is a block flow diagram depicting a method 736 for extracting financial account information using user data, in accordance with certain example embodiments, as referenced in block 736 of FIG. 7.

In block 805, the OCR application 115 accesses stored information associated with user 101. The names may be extracted from contact lists, email applications, user social networks, and other suitable user applications 116, information from which may be stored on the user device 110, the OCR system 120, or another suitable location.

In block 810, the OCR application 115 compares extracted information from the card image with the stored information. Names and other data from the stored information are compared to the extracted name from the card to look for matches. For example, the name of the user may be represented in the stored information.

In block 815, the OCR application 115 determines if information from the card image matches the stored information. In an example, twenty names in the contact list of the user are spelled "Smith"; however, the OCR algorithm determined that the name is "Snith." The OCR application 115 would determine that the information from the card image does not match the stored information.

From block 815, the method 736 returns to block 738 of FIG. 7.

Returning to FIG. 7, if the information from the card image matches the stored information, then the method 700 follows the "YES" branch of block 738 to block 235. If the information from the card image does not match the stored information, then the method 700 follows the "NO" branch of block 738 to block 230.

Following the NO branch to block 230, the method 700 may perform the method again as described herein in blocks 230 and 736. The OCR application 115 may perform the OCR process on an alternate set of digits on the card image. The OCR application 115 may request digit entry assistance from the user 102. The OCR application 115 may request name assistance from the user. The OCR application 115 may perform any suitable procedure upon a determination that user data does not match the stored information.

Block 235 is substantially similar to block 235 of FIG. 2.

Other Example Embodiments

Figure 10:
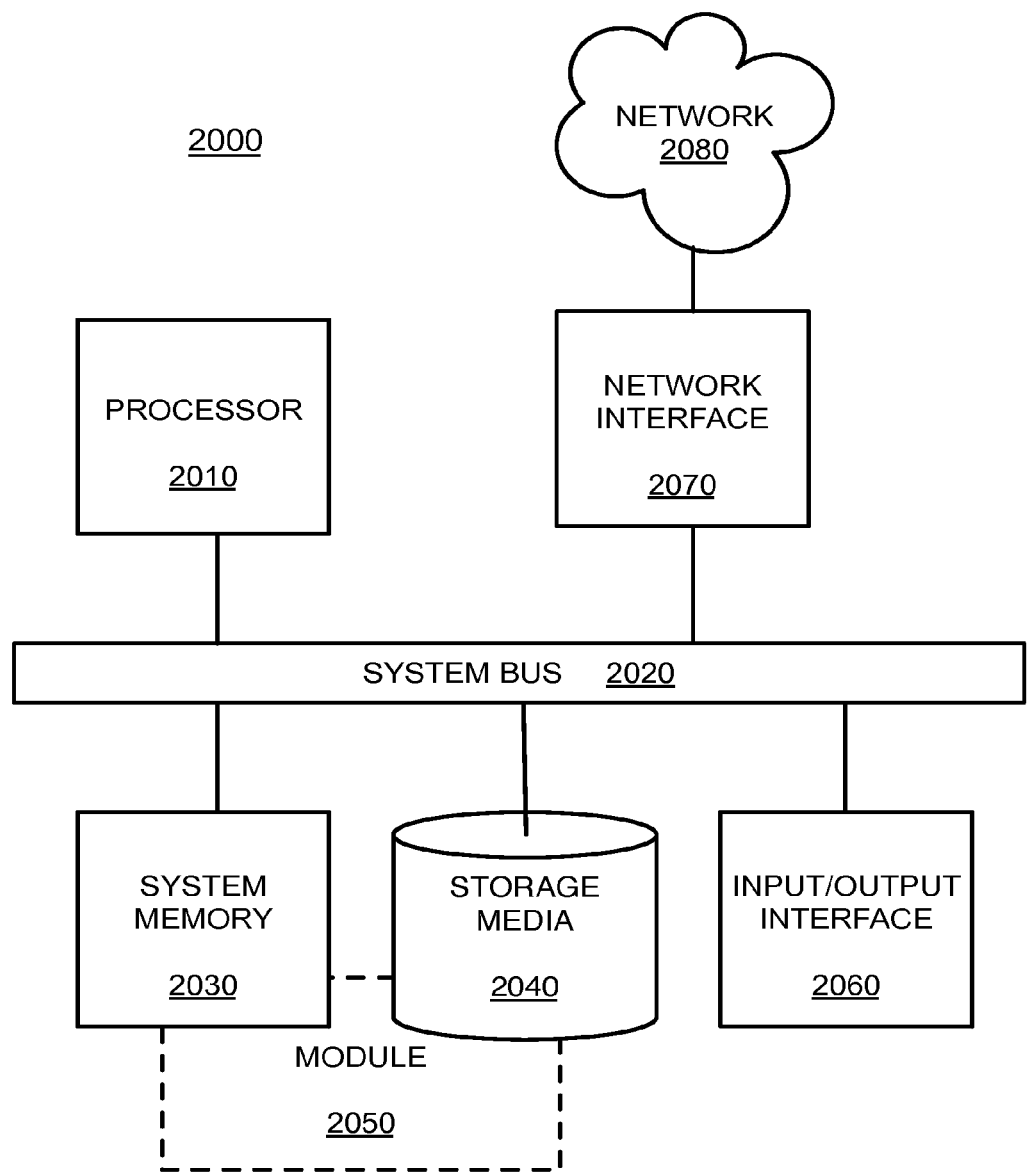
FIG. 10 is a block diagram depicting a computing machine and a module, in accordance with certain example embodiments.

FIG. 10 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain example embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to extract card information, comprising:

applying, by the one or more computing devices, an optical character recognition algorithm to a digital image of a card to obtain a result;

identifying, by the one or more computing devices, a name associated with the card based on information obtained via application of the optical character recognition algorithm to the digital image of the card;

determining, by the one or more computing devices, a set of user data that indicates an identity of a user; and determining, by the one or more computing devices, a confidence level of the result of the optical character recognition algorithm based at least in part on a comparison of the identified name to the set of user data indicating that the name correlates to data from the set of user data.

2. The method of claim 1, wherein the set of user data comprises one or more of a contact list of the user, social network data of the user, or email applications.

3. The method of claim 1, further comprising reapplying, by the one or more computing devices, the optical character recognition algorithm to the digital image of the card upon a determination that the confidence level is below a preconfigured threshold.

4. The method of claim 1, further comprising:
    requesting, by the one or more computing devices, an input of a revision of the identified name upon a determination that the confidence level is below a threshold validation; and
    receiving, by the one or more computing devices, the input of the revision of the identified name.

5. The method of claim 1, wherein the card comprises a credit card, a debit card, an identification card, a loyalty card, an access card, or a stored value card.

6. A computer program product, comprising:
    a non-transitory computer-readable storage device having computer-executable program instructions embodied thereon that when executed by a computer cause the computer to extract card information, comprising:
    computer-executable program instructions to apply an optical character recognition algorithm to a digital image of a card to obtain a result;
    computer-executable program instructions to identify a name associated with the card based on information obtained via application of the optical character recognition algorithm to the digital image of the card;
    computer-executable program instructions to determine a set of user data that indicates an identity of a user; and
    computer-executable program instructions to determine a confidence level of the result of the optical character recognition algorithm based at least in part on a comparison of the identified name to the set of user data indicating that the name correlates to data from the set of user data.

7. The computer program product of claim 6, wherein the set of user data comprises one or more of a contact list of the user, social network data of the user, or email applications.

8. The computer program product of claim 6, further comprising computer-executable program instructions to reapply the optical character recognition algorithm to the digital image of the card upon a determination that the confidence level is below a preconfigured threshold.

9. The computer program product of claim 6, further comprising:
    computer-executable program instructions to request an input of a revision of the identified name upon a determination that the confidence level is below a threshold validation; and
    computer-executable program instructions to receive the input of the revision of the identified name.

10. The computer program product of claim 6, wherein the card comprises a credit card, a debit card, an identification card, a loyalty card, an access card, or a stored value card.

11. A system to extract card information, comprising:
    a storage resource;
    a processor communicatively coupled to the storage resource, wherein the processor is configured to execute computer-readable instructions that are stored in the storage resource to cause the system to:
    apply an optical character recognition algorithm to a digital image of a card to obtain a result;
    identify a name associated with the card based on information obtained via application of the optical character recognition algorithm to the digital image of the card;
    determine a set of user data that indicates an identity of a user; and
    determine a confidence level of the result of the optical character recognition algorithm based at least in part on a comparison of the identified name to the set of user data indicating that the name correlates to data from the set of user data.

12. The system of claim 11, wherein the set of user data comprises one or more of a contact list of the user, social network data of the user, or email applications.

13. The system of claim 11, wherein the processor executes instructions stored in the storage resource to further cause the system to reapply the optical character recognition algorithm to the digital image of the card upon a determination that the confidence level is below a preconfigured threshold.

14. The system of claim 11, wherein the card comprises a credit card, a debit card, an identification card, a loyalty card, an access card, or a stored value card.

15. The system of claim 11, wherein the processor executes instructions stored in the storage resource to further cause the system to:
    request an input of a revision of the identified user name upon a determination that the confidence level is below a threshold validation; and
    receive the input of the revision of the identified name.

* * * * *